(12) United States Patent
Haneda et al.

(10) Patent No.: US 6,304,276 B1
(45) Date of Patent: Oct. 16, 2001

(54) DATA PROCESSING DEVICE AND DATA PROCESSING METHOD

(75) Inventors: Isamu Haneda, Soraku-gun; Toshio Isoe, Tenri, both of (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/116,573

(22) Filed: Jul. 16, 1998

(30) Foreign Application Priority Data

Aug. 26, 1997 (JP) .................................................... 9-228999

(51) Int. Cl.⁷ .................................................... G06T 11/40
(52) U.S. Cl. ........................... 345/594; 345/593; 345/581
(58) Field of Search .................................. 345/431, 150, 345/153, 173, 146, 156, 429, 326, 112; 382/163, 165

(56) References Cited

U.S. PATENT DOCUMENTS

| | | | | |
|---|---|---|---|---|
| 4,514,818 | * | 4/1985 | Walker ................................. | 345/150 |
| 5,150,458 | * | 9/1992 | Masuzaki et al. ................... | 345/435 |
| 5,307,452 | * | 4/1994 | Hahn et al. .......................... | 395/132 |
| 5,412,402 | * | 5/1995 | Searby et al. ........................ | 345/153 |
| 5,469,536 | * | 11/1995 | Blank .................................... | 345/431 |
| 5,710,899 | * | 1/1998 | Eick ...................................... | 395/339 |
| 5,900,860 | * | 5/1999 | Ueda .................................... | 345/150 |
| 5,963,199 | * | 10/1999 | Kato et al. ........................ | 345/173 X |
| 6,005,545 | * | 12/1999 | Nishida et al. ...................... | 345/150 |

FOREIGN PATENT DOCUMENTS

| | | |
|---|---|---|
| 7-21099 A | 1/1995 | (JP) . |
| 7-200152 A | 8/1995 | (JP) . |
| 8-163528 A | 6/1996 | (JP) . |

* cited by examiner

*Primary Examiner*—Matthew Luu
*Assistant Examiner*—Chanté Harrison
(74) *Attorney, Agent, or Firm*—Nixon & Vanderhye P.C.

(57) ABSTRACT

In a data processing device into which drawings can be inputted by, for example, touching a pen to the surface of a touch panel, in a draw mode, during inputting of a drawing, each line of the drawing is inputted and displayed in a different color. Then, in an erase mode, after designating the color of a line to be erased, the line to be erased is traced with the pen. By this means, even if a line to be erased is displayed so as to overlap with a line not to be erased, it is possible to erase only the line to be erased.

23 Claims, 9 Drawing Sheets

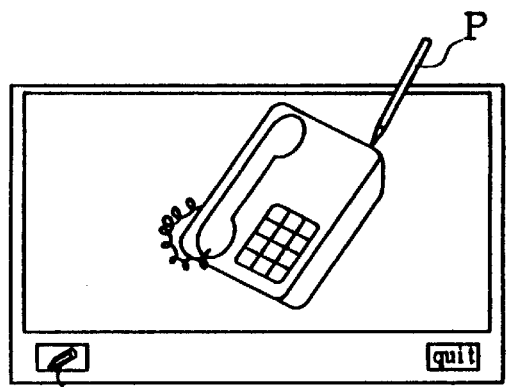
FIG. 9 (a) PRIOR ART
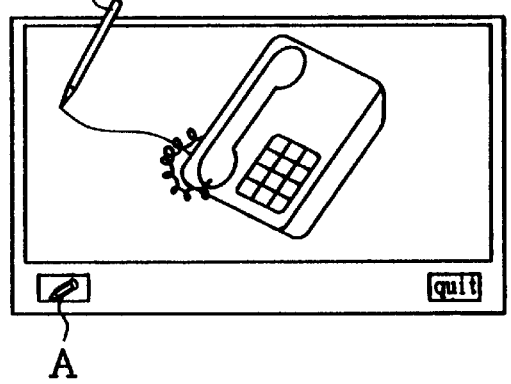
FIG. 9 (b) PRIOR ART
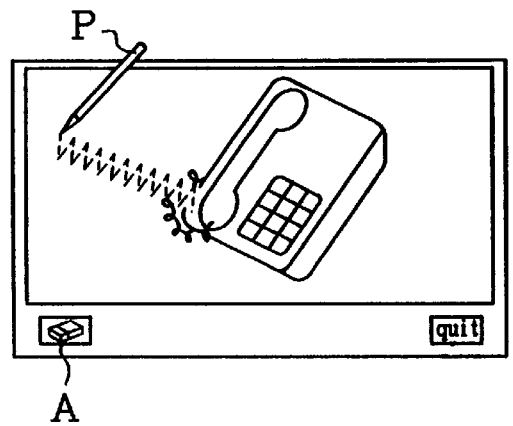
FIG. 9 (c) PRIOR ART
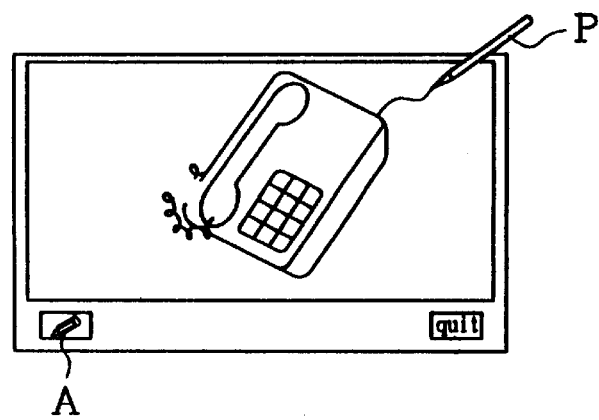
FIG. 9 (d) PRIOR ART

DATA PROCESSING DEVICE AND DATA PROCESSING METHOD

FIELD OF THE INVENTION

The present invention relates to a data processing device and data processing method for performing input, display, etc. of images in, for example, a word processor, personal computer, portable information terminal, etc.

BACKGROUND OF THE INVENTION

Conventionally, data processing devices such as word processors, personal computers, and portable information terminals have generally been provided with input means which allow a user to indicate a discretionary position on a display screen. Examples of such input means include the mouse, slide pad, and pen-shaped input device. Using this kind of input means, the user can perform such actions as indicating various processing operations, inputting images, etc.

With regard to processing in a data processing device like those mentioned above, whereby a user, using the input means, can draw a discretionary drawing, Japanese Unexamined Patent Publication No. 7-200152/1995 (Tokukaihei 7-200152/1995), for example, discloses the following touch panel input electronic device. When an erase mode (delete mode) is selected, this touch panel input electronic device performs processing which displays a predetermined figure centered on the position of the pen as detected by a coordinate detecting section, and erases the image within the displayed figure.

In this kind of touch panel input electronic device, when inputting a discretionary drawing using hand-drawn input, the following problems arise. FIGS. 9(a) through 9(b) are explanatory drawings showing the state of processing when using hand-drawn input to draw a telephone.

First, assume that, after confirming, that a draw/erase button A is in the draw mode, a telephone main body, receiver, and spiral cord connecting the receiver and the main body are drawn, as shown in FIG. 9(a).

Next, assume that a telephone cord is drawn extending from the lower left portion of the telephone main body, as shown in FIG. 9(b).

At this point, to change the point of connection of the telephone cord and the telephone main body to the upper right portion of the telephone in order to prevent the telephone cord and the spiral cord from crossing, the draw/erase button A is selected, thus switching to erase mode, as shown in FIG. 9(c). Then the telephone cord drawn in FIG. 9(b) is traced over using the pen P, as shown by the broken line in FIG. 9(c). In this way, the telephone cord drawn at the lower left portion of the telephone main body is erased.

However, as shown in FIG. 9 (d), in accompaniment with erasure of the telephone cord drawn at the lower left portion of the telephone main body, parts of the spiral cord and the telephone main body drawn adjacent to the telephone cord are also erased. Consequently, it is necessary to switch back to the draw mode by selecting the draw/erase button A, and then re-draw the erased parts of the spiral cord and telephone main body.

In this way, in hand-drawn input of a drawing, when two lines cross, erasing one line also causes part of the other line to be erased. Consequently, it is necessary to re-draw part of the other line, which has the drawback of making operations troublesome.

Again, Japanese Unexamined Patent Publication No. 8-163528/1996 (Tokukaihei 8-163528/1996), for example, discloses an image transmission system, in which a plurality of data processing devices are mutually connected, and through which users in separate locations view a common image, and attempt to reach understanding by mutually indicating in real time certain points on the image.

Again, Japanese Unexamined Patent Publication No. 7-21099/1995 (Tokukaihei 7-21099/1995), for example, discloses the following hand-drawing transmission method. This hand-drawing transmission method, as ink data are produced, produces text data and figure drawing commands, both of which are made of data structures having common features with the ink data, and performs real time transmission and display in predetermined data units of the ink data in a composite state with at least one of the text data and the figure drawing commands. By this means, it is possible to perform useful and efficient transmission among a plurality of pen computers capable of hand-drawn input, and for a group of users to edit a common text and drawing simultaneously.

When, as in the foregoing hand-drawing transmission method, a plurality of users edit a common drawing through transmission among a plurality of pen computers, a problem which arises is that it becomes impossible to distinguish which user drew which lines of the drawing on the display screen.

SUMMARY OF THE INVENTION

The first object of the present invention is to provide a data processing device which is able to select, at the time of input of a line, a color for display thereof, and to erase the lines of a displayed drawing separately by color.

Further, the second object of the present invention is to provide a data processing device which, when a plurality of users edit a common drawing using data processing devices connected by transmission lines, is able to select a color for display of lines inputted by each user, and to separately erase the lines inputted by each user.

In order to attain the first object above, a data processing device according to the present invention is made up of display means; input means for input of an image; color selecting means, which select colors for image portions inputted through the input means; color designating means, which designate a color of an image portion to be erased; image erasing means, which erase an image portion displayed in the color designated by the color designating means; and display control means, which cause the display means to display the image portions inputted through the input means in the colors selected by the color selecting means, and which cause the display means to display the image of which a portion has been erased by the erasing means.

With the foregoing structure, since the image portions inputted through the input means are displayed in the colors selected by the color selecting means, each inputted image portion can be displayed in a different color.

Further, since the image erasing means can erase an image portion which is displayed in the color designated by the color designating means, even if two image portions displayed in different colors overlap, it is possible to erase only one of the image portions by designating the color of the portion to be erased. Consequently, this solves the problem of unwanted erasure of image portions to be preserved which are adjacent to the image portion to be erased. Further, since it is no longer necessary to re-draw image portions to be preserved, operations can be expedited and operability improved.

In order to attain the second object above, another data processing device according to the present invention is made up of display means; receiving means for receiving a transmitted image; input means for input of an image; color designating means, which designate a color of an image portion to be erased; image erasing means, which erase an image portion displayed in the color designated by the color designating means; and display control means, which cause the display means to display in different colors the image received through the receiving means and the image inputted through the input means, and which cause the display means to display an image of which a portion has been erased by the erasing means.

With the foregoing structure, since the image received through the receiving means and the image inputted through the input means are displayed in different colors, images inputted by different users can be displayed in different colors.

Further, since the image erasing means can erase an image portion which is displayed in the color designated by the color designating means, even if image portions inputted by different users overlap, it is possible to erase an image portion inputted by a certain user by designating the color of the portion to be erased. Consequently, this solves the problem of, for example, a user accidentally erasing image portions inputted by other users when erasing a portion he himself inputted. Further, by this means, operations can be expedited and operability improved when a plurality of users edit a common image.

Additional objects, features, and strengths of the present invention will be made clear by the description below. Further, the advantages of the present invention will be evident from the following explanation in reference to the drawings.

BRIEF DESCRIPTION OF THE DRAWINGS

FIGS. 9(*a*) through 9(*d*) are explanatory drawings showing the state of processing on the display screen of a conventional touch panel input electronic device.

DESCRIPTION OF THE EMBODIMENTS

The following will explain one embodiment of the present invention with reference to the drawings.

Figure 1:
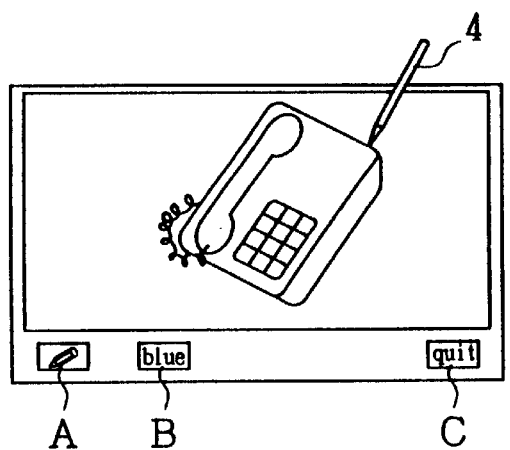
FIGS. 1(*a*) through 1(*d*) are explanatory drawings showing the state of processing on the display screen of a data processing device according to one embodiment of the present invention.
Figure 1:
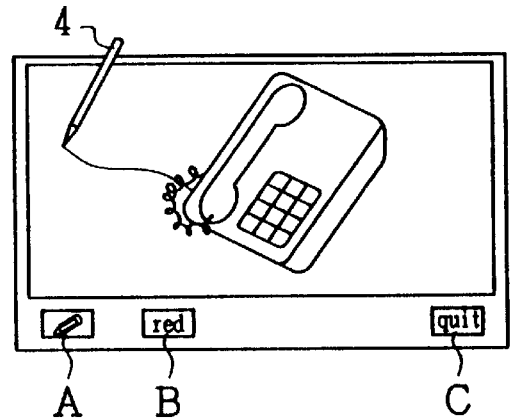
Figure 1:
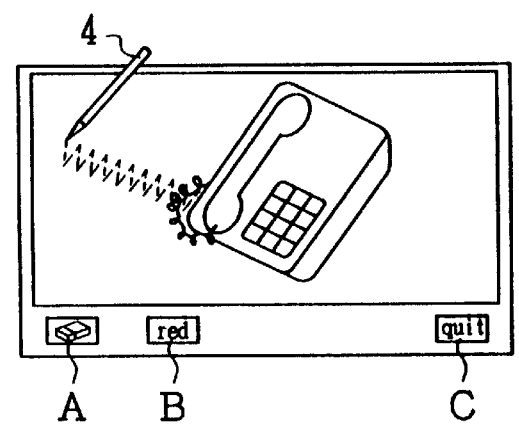
Figure 1:
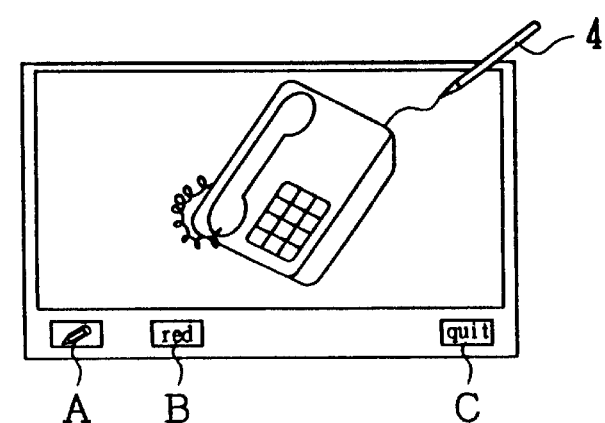

FIGS. 1(*a*) through 1(*d*) are explanatory drawings showing the state of processing on the display screen of a data processing device according to the present embodiment. As shown in FIGS. 1(*a*) through 1(*d*), on the display screen are displayed a draw/erase button A, a color select button B, and a quit button C. When the draw/erase button A is pressed, the draw/erase mode is switched between draw mode and erase mode, and when the color select button B is pressed, the color mode is switched between red and blue. When the quit button C is pressed, all processing is ended. The following will explain processing when a telephone is drawn on the display screen by hand.

FIG. 1(*a*) shows a state in which the draw/erase mode is in draw mode, and the color mode is blue. On the display screen, the draw/erase button A displays the figure of a pencil, which indicates draw mode, and the color select button B displays blue. Further, on the display screen, a telephone main body, receiver, and spiral telephone cord connecting the telephone main body and receiver have already been drawn in blue.

In this state, if the color select button B is pressed, as shown in FIG. 1 (*b*), the color select button B displays red, and the color mode is red. Then, if a telephone cord is drawn using a pen 4, a telephone cord is displayed in red.

Then, in order to erase the telephone cord, as shown in FIG. 1(*c*), the draw/erase button A is pressed, thus switching to erase mode. At this time, the draw/erase button A displays the figure of an eraser, which indicates erase mode. Then, by tracing over the drawn telephone cord using the pen 4, the telephone cord alone is erased. At this time, the lines making up the telephone main body, spiral cord, etc. are not erased. In other words, when the color mode is red, the lines which are erased using erase mode are only the lines drawn in red.

Next, as shown in FIG. 1(*d*), by pressing the draw/erase button A and switching the draw/erase mode to draw mode, a new telephone cord can be drawn.

As discussed above, with the data processing device according to the present embodiment, when using erase mode to erase lines of a drawing on the display screen, it is possible to erase only those lines of a color designated by the color mode.

Figure 2:
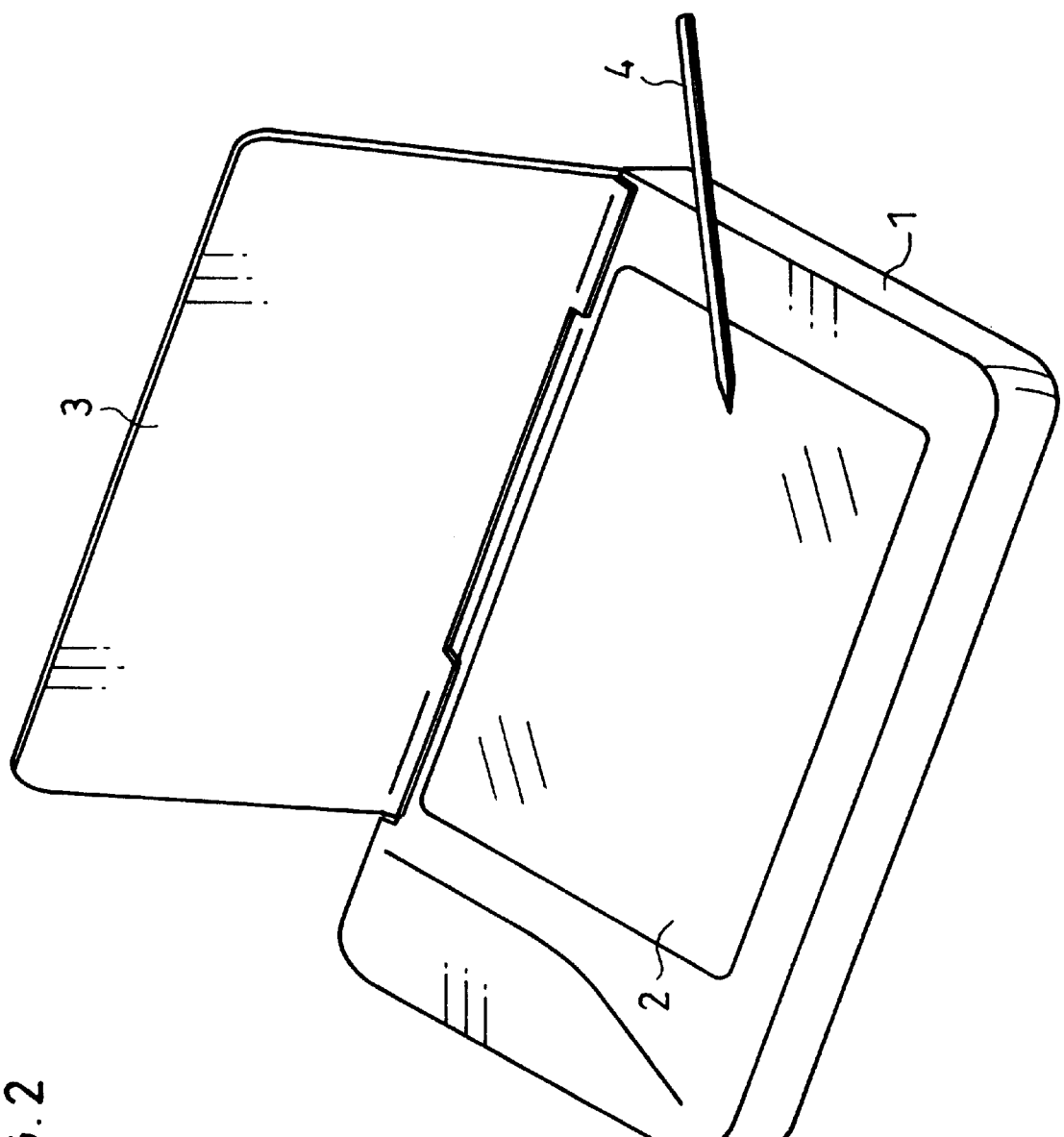
FIG. 2 is a perspective drawing schematically showing the appearance of the foregoing data processing device.

FIG. 2 is a perspective view schematically showing the appearance of a data processing device according to the present embodiment. This data processing device is made up of a main body housing section 1, an input/output section 2, a cover section 3, and a pen 4.

Although not shown in the Figure, the main body housing section 1 is provided with an infrared transmission section, a pen holding section, etc., and in the main body housing section 1 are housed members such as a power section for providing power to necessary points of, for example, a control circuit for controlling the input/output section 2, the infrared transmission section, an interface, etc.

Figure 3:
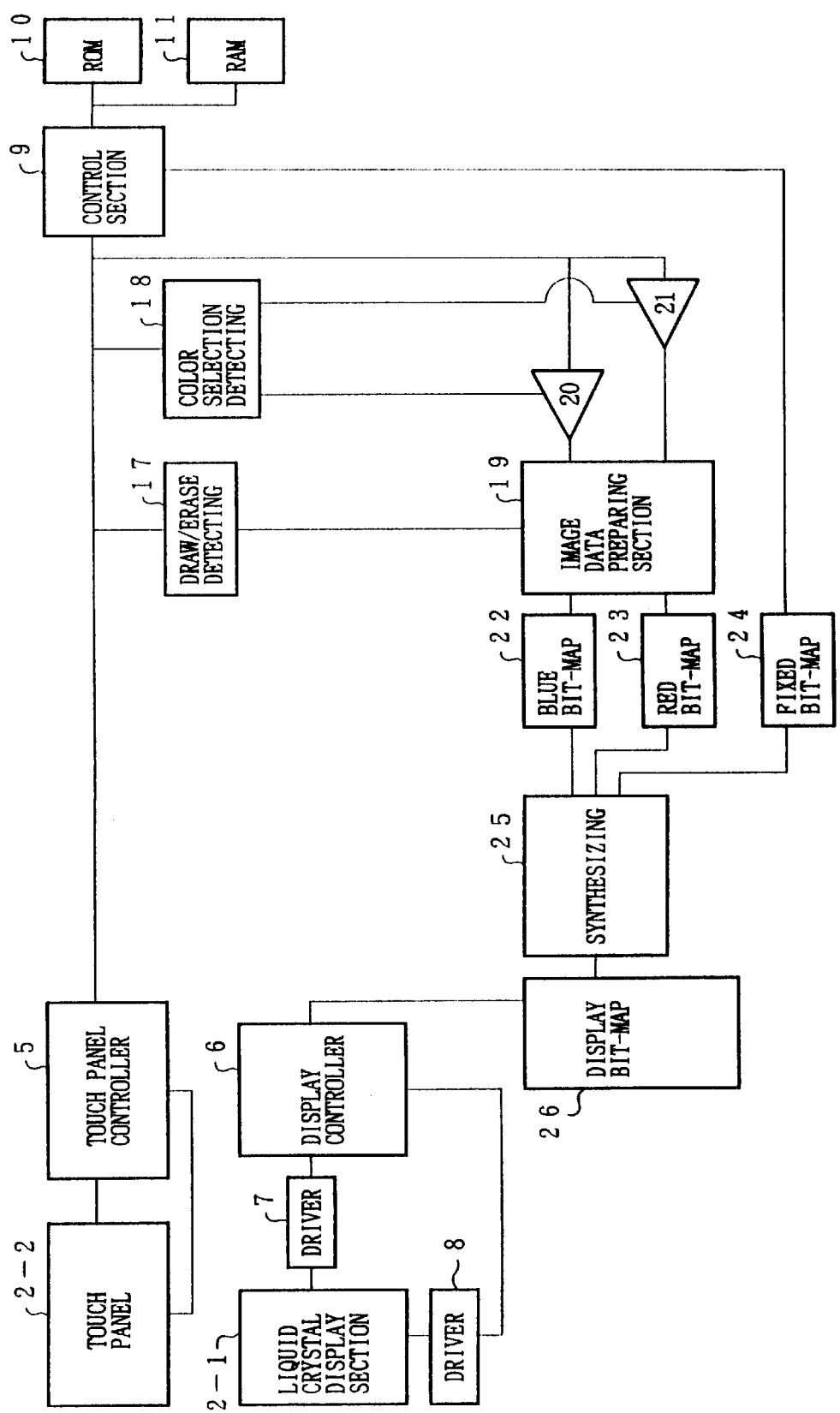
FIG. 3 is a block diagram schematically showing one example of a structure for the foregoing data processing device.

As shown in FIG. 3, the input/output section 2 is provided with a liquid crystal display section 2-1 (display means) of a thin type structured according to the matrix method, which is capable of displaying characters and images, and a touch panel 2-2 (input means; image erasing means) which is transparent and which is of a size capable of covering the liquid crystal display section 2-1. The touch panel 2-2 has, for example, a structure in which transparent electrodes are provided on the inner surfaces of two transparent sheets, between which are regularly arranged spacers in the shape of small protuberances, which in a normal state prevent the transparent electrodes from coming into contact with one another. Then, when a point on the surface of the touch panel 2-2 is pressed with a finger or with the pen 4, the transparent electrodes come into contact at that point, and a current flow at that point allows detection of the point pressed.

Further, by referring to location data of the display contents displayed on the liquid crystal display section 2-1, the location on the liquid crystal display section 2-1 selected by the user is detected.

Incidentally, a backlight made of an EL panel, etc., may be provided, as necessary, on the rear surface of the liquid crystal display section 2-1.

The cover section 3 is connected to the rear edge of the upper surface of the main body housing section 1 by a hinge, and, by rotating the cover section 3 so as to cover the input/output section 2, serves to protect the input/output section 2 during transportation. The pen 4 is used for inputting characters, drawings, etc. through the transparent touch panel 2-2.

EXAMPLE 1

The following will explain one example of the foregoing data processing device. FIG. 3 is a block diagram of the present Example 1. The liquid crystal display section 2-1 and the touch panel 2-2 are as described above, and accordingly explanation thereof will be omitted here.

A touch panel controller 5 serves to detect coordinate data corresponding to input to the touch panel 2-2. The touch panel controller 5 is connected to the transparent electrodes provided on each of the two transparent sheets making up the touch panel 2-2. When the transparent electrodes of both transparent sheets come into contact at a point indicated by a finger or by the pen 4, the coordinates of that point are detected.

A display controller 6 stores as a bit-map the locations of the pixels which illuminate the liquid crystal, and, as necessary, sends signals to drivers 7 and 8. Further, a control section 9 controls input data and output data by means of various commands.

A ROM 10 includes a program area in which is stored a program indicating the operations of the control section 9, a font data area in which are stored fonts for characters displayed on the liquid crystal display section 2-1, a coordinate conversion memory area in which is stored conversion data for performing conversion of coordinates detected by the touch panel controller 5 into coordinates corresponding to display locations, etc.

Further, a RAM 11 stores various data such as text, drawings, etc. inputted by the user through the input/output section 2.

The following will explain processing in the data processing device according to Example 1.

Coordinates inputted to the touch panel 2-2 using the pen 4 are detected by the touch panel controller 5, and are sent to the control section 9, to a draw/erase detecting section 17, to a color selection detecting section 18 (color selection/designation detecting means), and to gates 20 and 21.

The draw/erase detecting section 17 detects whether the inputted coordinates are within the space where the draw/erase button A is displayed. In the draw/erase detecting section 17 is provided a flag for maintaining the draw/erase mode. Each time the coordinates detected are within the space where the draw/erase button A is displayed, the draw/erase detecting section 17 changes the flag, and sends this flag data to an image data preparing section 19.

The color selection detecting section 18 detects whether the inputted coordinates are within the space where the color select button B is displayed. In the color selection detecting section 18 is provided a flag for maintaining the color mode. Each time the coordinates detected are within the space where the color select button B is displayed, the color selection detecting section 18 changes the flag, and sends this flag data to the gate 20 and inverted data to the gate 21. In other words, according to the color selected, one of the two gates 20 and 21 is opened, and the other is closed.

The shapes of the draw/erase button A, the color select button B, the quit button C, the frame bordering the space for input and editing of drawings, etc. are previously stored in the ROM 10, and are also held by the control section 9 in a fixed bit-map 24 as bit data.

Here, assume that the flag of the draw/erase detecting section 17 is set so that the draw/erase mode is draw mode, and that the flag of the color selection detecting section 18 is set so that the color mode is blue.

In this state, if, using the pen 4, etc., a drawing is drawn within the frame bordering the space for input and editing of drawings, the position thereof is converted to coordinates by the touch panel controller 5, which sends the coordinates to the control section 9, to the draw/erase detecting section 17, to the color select detecting section 18, and to the gates 20 and 21.

At this time, since the inputted coordinates are not within the space where the draw/erase button A or the color select button B are displayed, the flags of the draw/erase detecting section 17 and the color selection detecting section 18 are not changed.

When the flag of the color selection detecting section 18 is set to blue, the gate 20 is open and the gate 21 is closed. Accordingly, the coordinate data sent to the gates 20 and 21 is sent through the gate 20 to the image data preparing section 19.

Then, since the flag of the draw/erase detecting section 17 is set to draw mode, the image data preparing section 19 writes data signifying "ON" to a blue bit-map 22 (image storing means) at a bit-map position corresponding to the inputted coordinate position. If, on the other hand, the flag of the draw/erase detecting section 17 is set to erase mode, the image data preparing section 19 writes data signifying "OFF" to the blue bit-map 22 at a bit-map position corresponding to the inputted coordinate position. The image data preparing section 19 also detects whether the inputted coordinates are within the frame bordering the space for input and editing of drawings.

Again, if the flag of the color selection detecting section 18 is set to red, the gate 21 is open, and the coordinate data is sent through the gate 21 to the image data preparing section 19. Then, in accordance with the flag data of the draw/erase detecting section 17, the image data preparing section 19 performs drawing or erasing on a red bit-map 23 (image storing means).

Thereafter, treating the ON data of the blue bit-map 22 as blue, the ON data of the red bit-map 23 as red, and the data of the fixed bit-map 24 as black, all of these image data are synthesized by a synthesizing section 25. Then the synthesized image data is held in a display bit-map 26, and the contents thereof are displayed by means of the display controller 6.

As explained above, in the data processing device according to the present embodiment, when the flag of the draw/erase detecting section 17 is set to draw mode, drawing can be performed in the color selected by the flag of the color selection detecting section 18, and when the flag of the draw/erase detecting section 17 is set to erase mode, erasing of the color selected by the flag of the color selection detecting section 18 can be performed.

Figure 4:
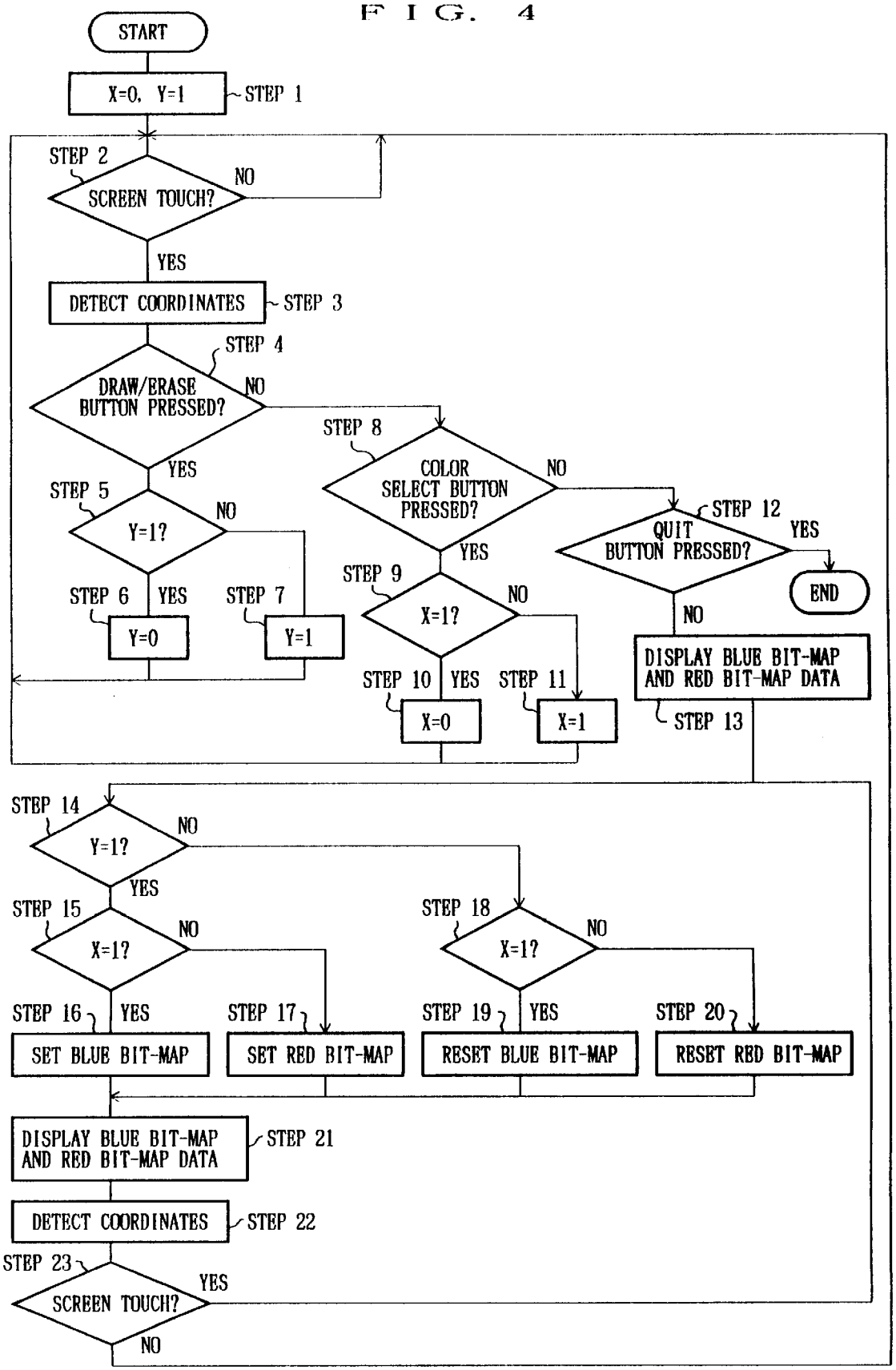
FIG. 4 is a flow-chart showing the flow of processing in the example shown in FIG. 3.

Next, the foregoing processing will be explained with reference to the flow-chart in FIG. 4. Here, a variable X is a variable for color selection, and a variable Y is a variable for draw/erase selection.

First, in Step 1, as initial values, the variable X and the variable Y are set to initial values of "0" and "1" respectively. Next, in Step 2, a state of readiness for input to the touch panel 2-2 is maintained. If there is an input to the touch panel 2-2, the inputted coordinates are detected in Step 3. Then, in Step 4, it is determined whether the draw/erase button A was pressed.

If the draw/erase button A was not pressed, operations proceed to Step 8, but if it was pressed, operations proceed to Step 5, where it is determined whether the variable Y is "1."

Here, if the variable Y is "1," the variable Y is set to "0" in Step 6, and operations return to Step 2. If the variable Y is "0," however, the variable Y is set to "1" in Step 7, and operations return to Step 2.

If it was determined in Step 4 that the draw/erase button A was not pressed, it is determined in Step 8 whether the color select button B was pressed. If the color select button B was not pressed, operations proceed to Step 12, but if it was pressed, it is determined in Step 9 whether the variable X is "1."

Here, if the variable X is "1," the variable X is set to "0" in Step 10, and operations return to Step 2. If the variable X is "0," however, the variable X is set to "1" in Step 11, and operations return to Step 2.

If it was determined in Step 8 that the color select button B was not pressed, it is determined in Step 12 whether the quit button C was pressed. If the quit button C was pressed, processing is ended, but if it was not pressed, processing proceeds to Step 13. In Step 13, the red bit-map 23 and the blue bit-map 22 are displayed on the liquid crystal display section 2-1.

Next, in Step 14, it is determined whether the variable Y is "1." If the variable Y is "0," operations proceed to Step 18, but if the variable Y is "1," it is determined in Step 15 whether the variable X is "1."

If the variable X is "1" in Step 15, then in Step 16, bit data corresponding to the inputted coordinates is set in the blue bit-map 22, and operations proceed to Step 21. If the variable X is "0," however, then in Step 17, bit data corresponding to the inputted coordinates is set in the red bit-map 23, and operations proceed to Step 21.

If it is determined in Step 14 that the variable Y is not "1," then it is determined in Step 18 whether the variable X is "1."

If the variable X is "1" in Step 18, then in Step 19, bit data corresponding to the inputted coordinates is reset in the blue bit-map 22, and operations proceed to Step 21. If the variable X is "0," however, then in Step 20, bit data corresponding to the inputted coordinates is reset in the red bit-map 23, and operations proceed to Step 21.

In Step 21, the bit data of the red bit-map 23 and the blue bit-map 22 is displayed on the liquid crystal display section 2-1, and then in Step 22, the coordinates touched by the user are detected.

In Step 23, it is determined whether the user is still touching the touch panel 2-2, and if the user is no longer touching the touch panel 2-2, operations return to Step 2 and wait for further input to the touch panel 2-2. If it is determined in Step 23 that the user is still touching the touch panel 2-2, then operations return to Step 14.

By means of the processing above, by selecting a color at the time of input of each line of a drawing, it is possible to erase only lines of a designated color.

EXAMPLE 2

Figure 5:
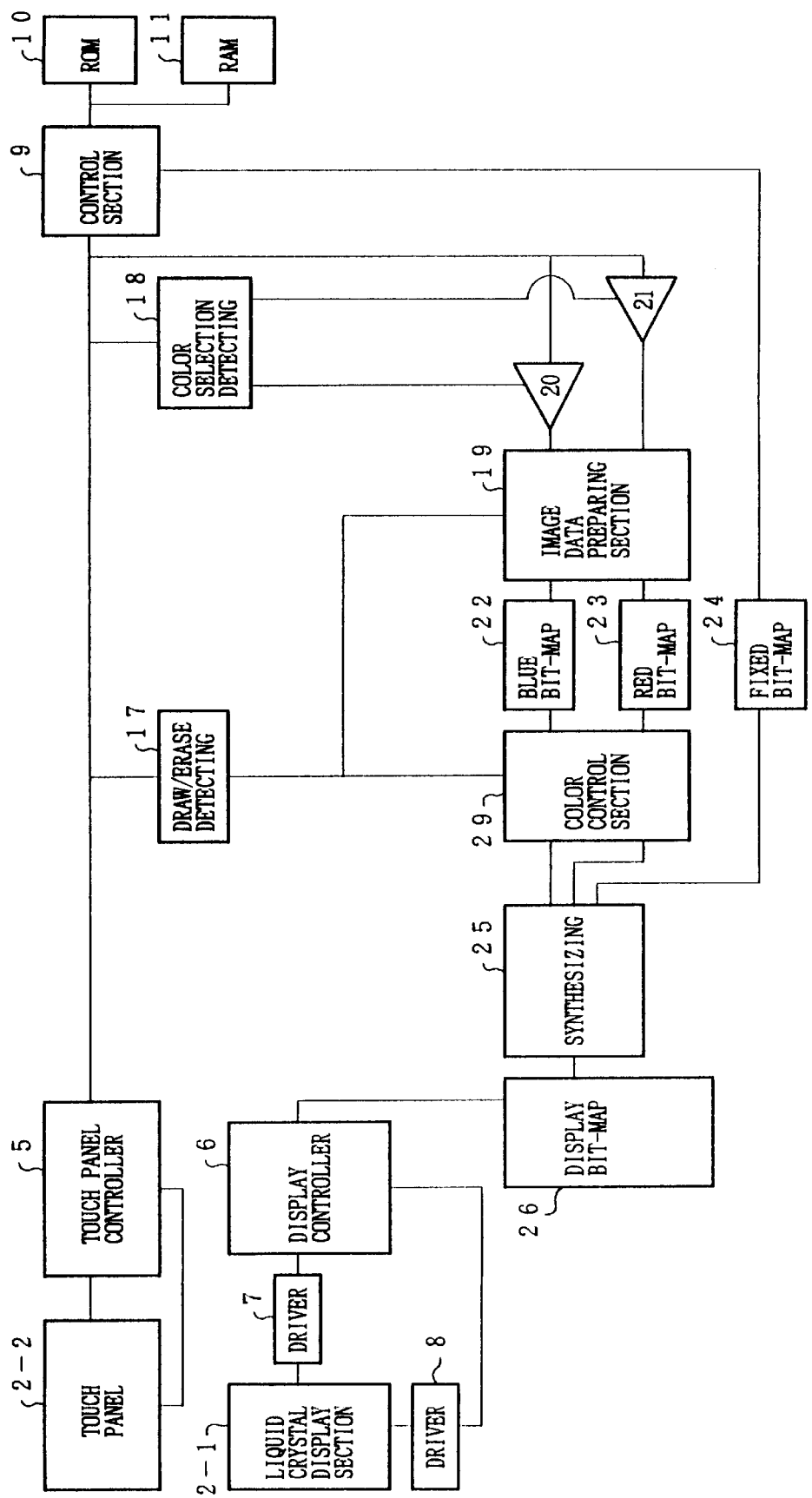
FIG. 5 is a block diagram schematically showing another example of a structure for the foregoing data processing device.

The following will explain another example of the foregoing data processing device. FIG. 5 is a block diagram of the present Example 2.

Here, the liquid crystal display section 2-1, the touch panel 2-2, the touch pad controller 5, the display controller 6, the drivers 7 and 8, the control section 9, the ROM 10, the RAM 11, the draw/erase detecting section 17, the color selection detecting section 18, the image data preparing section 19, the gates 20 and 21, the blue bit-map 22, the red bit-map 23, the fixed bit-map 24, the synthesizing section 25, and the display bit-map 26 have the same structures as in Example 1, and accordingly, explanation thereof will be omitted.

In comparison with the data processing device in Example 1, that of Example 2 is further provided with a color control section 29. The color control section 29 is provided between the blue bit-map 22 and the red bit-map 23 on the one hand, and the synthesizing section 25 on the other. Based on output from the draw/erase detecting section 17, the color control section 29 converts the image data outputted from the blue bit-map 22 and the red bit-map 23.

To explain in more detail, when the draw/erase detecting section 17 is set to draw mode, data from the blue bit-map 22, which is to be displayed in blue, and from the red bit-map 23, which is to be displayed in red, are both converted to black and sent to the synthesizing section 25. In other words, in draw mode, lines drawn in whatever color are displayed in black.

When the draw/erase detecting section 17 is set to erase mode, on the other hand, data from the blue bit-map 22, which is to be displayed in blue, and from the red bit-map 23, which is to be displayed in red, are outputted in their respective colors. In other words, since the lines corresponding to the respective colors are displayed in the colors selected at the time of input, a line to be erased can be easily recognized.

Figure 6:
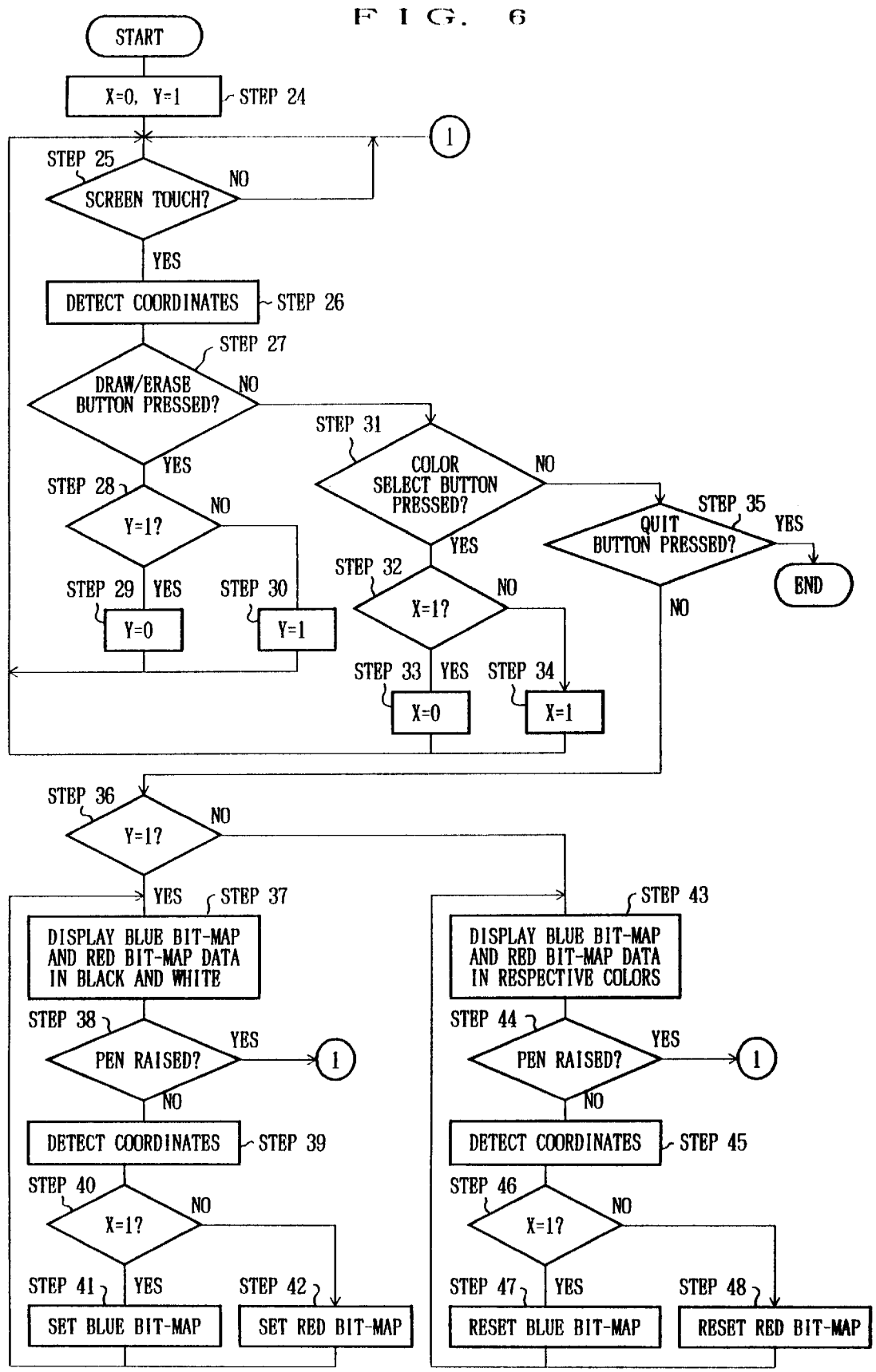
FIG. 6 is a flow-chart showing the flow of processing in the example shown in FIG. 5.

Next, the foregoing processing will be explained with reference to the flow-chart in FIG. 6. In FIG. 6, operations in Step 24 through Step 35 are equivalent to those in Step 1 through Step 12 of Example 1, and accordingly, explanation thereof will be omitted here.

In Step 36, it is determined whether the draw/erase mode variable Y is "1," and if it is determined that the variable Y is "1," then in Step 37, the data stored in both the blue bit-map 22 and the red bit-map 23 are converted to black, and the image is displayed on the display screen.

If, on the other hand, it is determined in Step 36 that the variable Y is not "1," then in Step 43, the data of the blue bit-map 22 and of the red bit-map 23 are displayed on the display screen in blue and red, respectively.

After display of the image in black in Step 37 (draw/erase mode =draw), it is determined in Step 38 whether the pen 4 has been raised from the touch panel 2-2. If it is determined that the pen 4 has been raised from the touch panel 2-2, then operations return to Step 25, but if input to the touch panel 2-2 is detected, the coordinates thereof are detected in Step 39.

At this time, in Step 40, if "1," which indicates that the color mode is blue, is assigned to the variable X, then operations proceed to Step 41. In Step 41, data is set in the blue bit-map 22 so as to turn on data at a coordinate position corresponding to the coordinates inputted in Step 39.

In the same way, in Step 40, if "1," which indicates that the color mode is blue, is not assigned to the variable X, then operations proceed to Step 42. In Step 42, data is set in the red bit-map 23 so as to turn on data at a coordinate position corresponding to the coordinates inputted in Step 39.

After displaying the data of the blue bit-map 22 and the red bit-map 23 in their respective colors in Step 43 (draw/erase mode=erase), it is determined in Step 44 (as in Step 38) whether the pen 4 has been raised from the touch panel 2-2. If it is determined that the pen 4 has been raised from the touch panel 2-2, then operations return to Step 25, but if input to the touch panel 2-2 is detected, the coordinates thereof are detected in Step 45.

At this time, in Step 46, if "1," which indicates that the color mode is blue, is assigned to the variable X, then in Step 47, data is reset in the blue bit-map 22 so as to turn off data at a coordinate position corresponding to the coordinates inputted in Step 45. In the same way, in Step 46, if "1," which indicates that the color mode is blue, is not assigned to the variable X, then in Step 48, data is reset in the red bit-map 23 so as to turn off data at a coordinate position corresponding to the coordinates inputted in Step 45.

Incidentally, in Step 37 and Step 43, the foregoing only explains display of inputted drawing data, but data for display of the draw/erase button A, the color select button B, etc. is displayed with the same timing as the inputted drawing data.

By means of the processing described above, during drawing, the entire drawing is displayed in customary black, and during erasing, each line of the drawing is displayed in blue or red, depending on the color mode selected when the line was drawn, and thus a line to be erased can be easily recognized.

EXAMPLE 3

Figure 7:
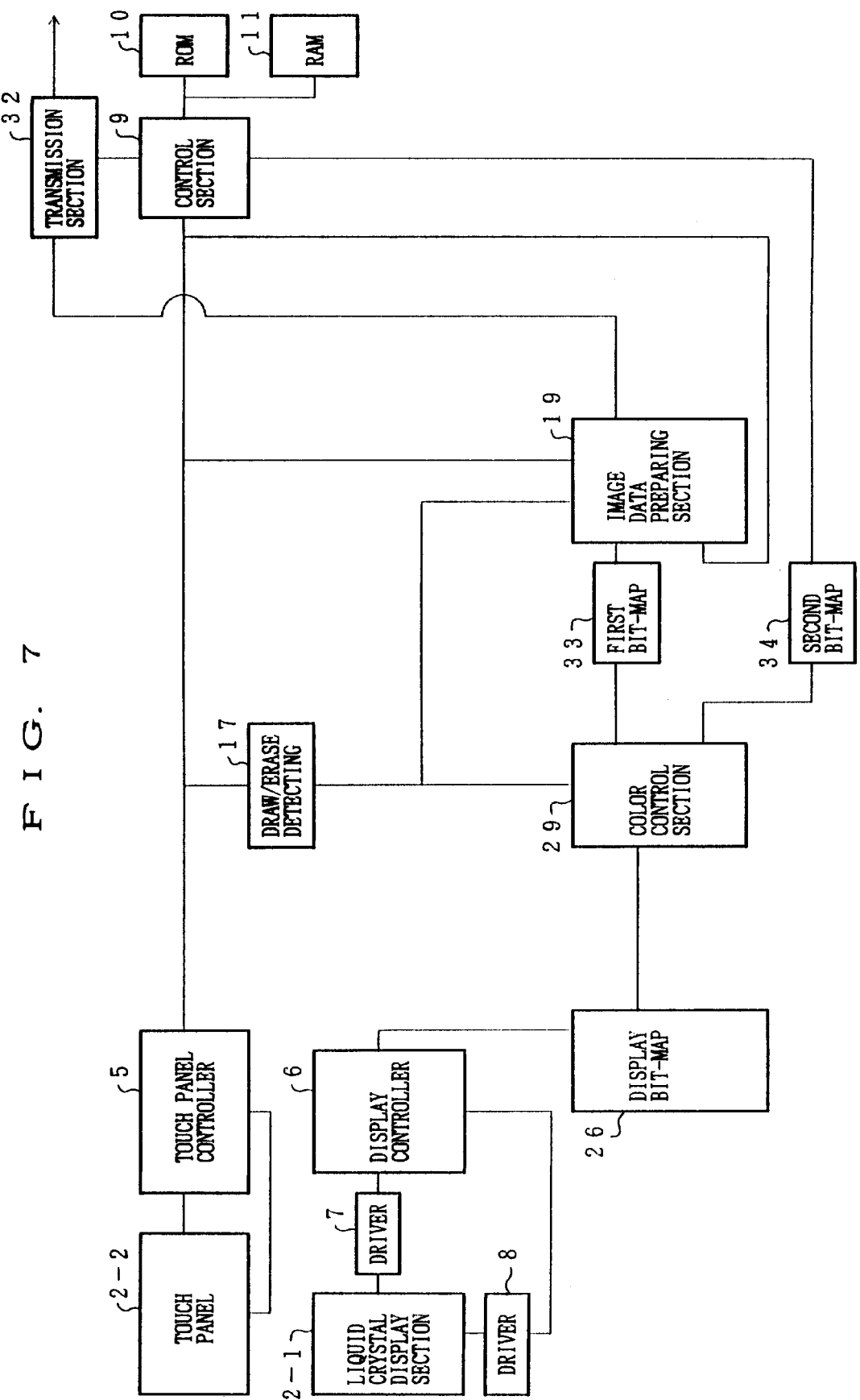
FIG. 7 is a block diagram schematically showing a further example of a structure for the foregoing data processing device.

The following will explain a further example of the foregoing data processing device. FIG. 7 is a block diagram of the present Example 3.

Here, the liquid crystal display section 2-1, the touch panel 2-2, the touch pad controller 5, the display controller 6, the drivers 7 and 8, the control section 9, the ROM 10, the RAM 11, the draw/erase detecting section 17, the image data preparing section 19, and the display bit-map 26 have the same structures as in Examples 1 and 2, and accordingly, explanation thereof will be omitted.

The data processing device according to Example 3 is provided with a first bit-map 33, which stores drawing data inputted by a primary user, and a second bit-map 34, which stores drawing data inputted by a second party to transmission through a transmission section 32.

When the draw/erase detecting section 17 is set to draw mode, the color control section 29 synthesizes data stored in the first bit-map 33 (image storing means) and the second bit-map 34 (image storing means) and sends the synthesized data to the display bit-map 26.

In this state, if there is input within the area for drawing input, the coordinates of the position of that input are sent to the image data preparing section 19, and the first bit-map 33 is set so that the coordinate position is turned on.

Further, the image data preparing section 19 also sends a signal for display of the coordinates inputted on the touch panel 2-2 through the transmission section 32 to the other party to transmission. Upon receiving this signal, the device of the other party, in order to display the received coordinates, sets the received coordinates in its second bit map. By this means, a common image can be displayed in real time on the display screens of both the user's and the other party's data processing devices.

If, on the other hand, the draw/erase detecting section 17 is set to erase mode, the color control section 29 converts the image data of the first bit-map 33 and of the second bit-map 34 so that the image data of each of these bit-maps will be displayed in different colors, and sends this converted image data to the display bit-map 26. By this means, the liquid crystal display section 2-1 displays in different colors the lines drawn by the primary user and those drawn by the other party to transmission. Consequently, lines drawn by the primary user and those drawn by the other party to transmission can be recognized by color.

Processing such as, for example, erasure of only lines drawn by the user can be performed by the following operations. With the draw/erase detecting section set to erase mode, input to the touch panel 2-2 erases inputted coordinate position data of the first bit-map 33, and, through the transmission section 32, corresponding data is also reset in the other party's second bit-map.

Figure 8:
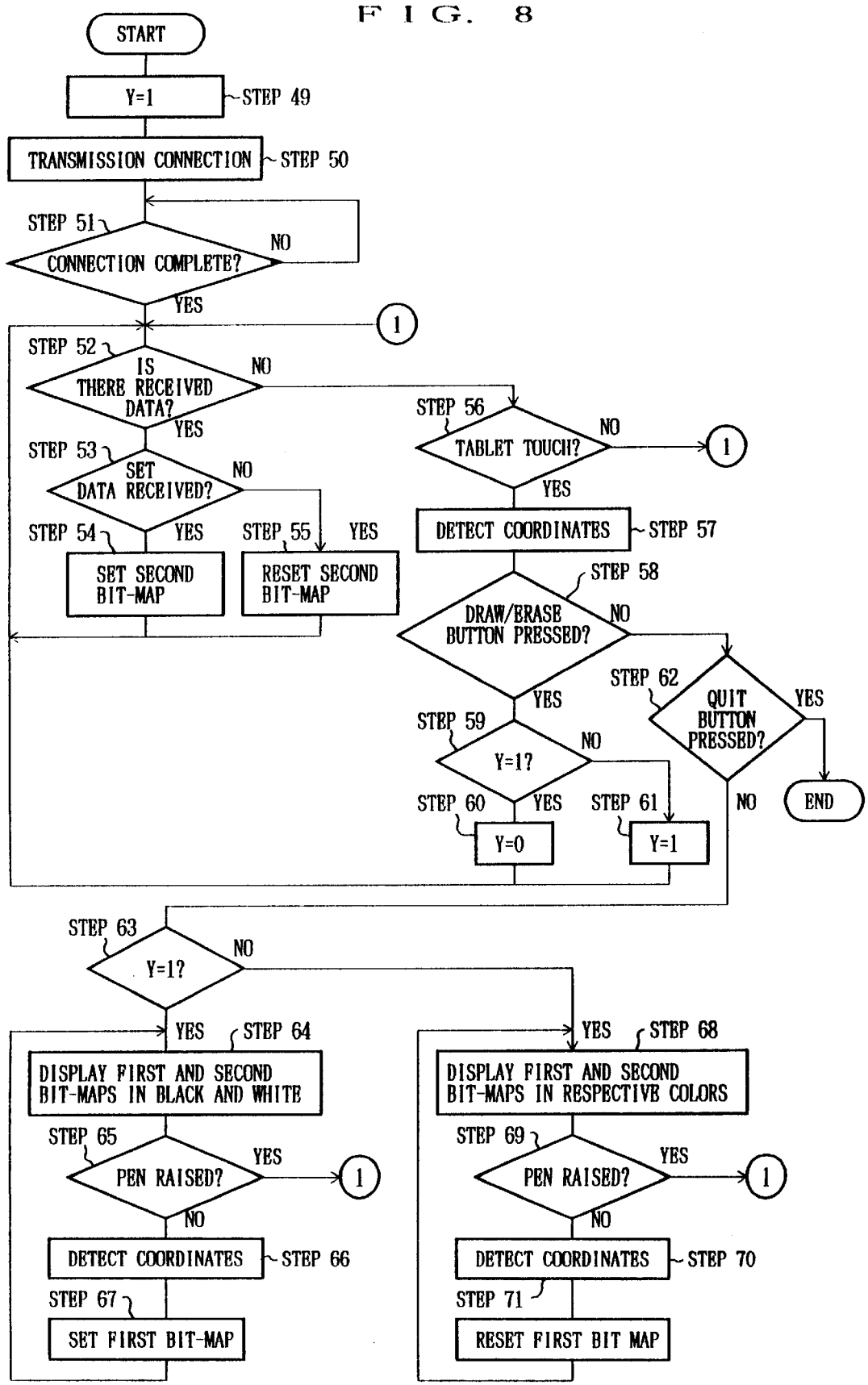
FIG. 8 is a flow-chart showing the flow of processing in the example shown in FIG. 7.

Next, the foregoing processing will be explained with reference to the flow-chart in FIG. 8. Here, the variable Y is a draw/erase variable of the RAM 11.

First, in Step 49, the variable Y is set to an initial value of "1." Next, in Step 50, the transmission section 32 makes a transmission connection with the other party to transmission, and in Step 51, it is determined whether connection is completed.

When connection is completed, in Step 52, it is determined whether there is any received data, and if there is no received data, operations proceed to Step 56. If there is received data, it is determined in Step 53 whether set data has been received from the other party to transmission.

If set data has been received, the second bit-map 34 is set in Step 54, but if no set data has been received, the second bit-map 34 is reset in Step 55.

If it is determined in Step 52 that there is no received data from the other party, then it is determined in Step 56 whether there is any input to the touch panel 2-2.

If there is input to the touch panel 2-2, the coordinates of the input position are detected in Step 57, and then in Step 58, it is determined whether the draw/erase button A was pressed.

If the draw/erase button A was not pressed, operations proceed to Step 62, but if it was pressed, operations proceed to Step 59, where it is determined whether the variable Y is "1."

Here, if the variable Y is "1," the variable Y is set to "0" in Step 60, and operations return to Step 52. If the variable Y is "0," however, the variable Y is set to "1" in Step 61, and operations return to Step 52.

If it was determined in Step 58 that the draw/erase button A was not pressed, it is determined in Step 62 whether the quit button C was pressed. If the quit button C was pressed, processing is ended, but if the quit button C was not pressed, then it is determined in Step 63 whether the variable Y is "1."

If, in Step 63, the variable Y is "0," operations proceed to Step 68, and if the variable Y is "1," operations proceed to Step 64. In Step 64, the image data of the first bit-map 33 and of the second bit-map 34 are converted into black and white, and the converted image is displayed on the liquid crystal display section 2-1.

Next, in Step 65, it is determined whether the pen 4 has been raised from the touch panel 2-2, and if the pen 4 has been raised, operations return to Step 52 and wait for further input to the touch panel 2-2.

If it is determined in Step 65 that the pen 4 has not been raised from the touch panel 2-2, then in Step 66 the coordinates touched by the pen 4 are detected, and in Step 67 the first bit-map 33 is set in accordance therewith, after which operations return to Step 64. The operations in Step 64 through Step 67 are repeated until the pen 4 is raised from the touch panel 2-2.

If, on the other hand, it is determined in Step 63 that the variable Y is not "1," then in Step 68 the image data of the first bit-map 33 and of the second bit-map 34 are displayed on the liquid crystal display section 2-1 in their respective colors.

Next, in Step 69, it is determined whether the pen 4 has been raised from the touch panel 2-2. and if the pen 4 has been raised, operations return to Step 52 and wait for further input to the touch panel 2-2.

If it is determined in Step 69 that the pen 4 has not been raised from the touch panel 2-2, then in Step 70 the coordinates touched by the pen 4 are detected, and in Step 71 the first bit-map 33 is reset in accordance therewith, after which operations return to Step 68. The operations in Step 68 through Step 71 are repeated until the pen 4 is raised from the touch panel 2-2.

By means of the processing above, when two data processing devices are connected via transmission lines, and two users edit a common drawing simultaneously, lines inputted by each user can be displayed in a common color in draw mode, and in a different color for each user in erase mode.

As discussed above, a data processing device according to the present invention is made up of input means for input of images; storing means for storing the images inputted through the input means; selecting means, which select colors for the images inputted through the input means; display means, which display the images inputted through the input means in the colors selected by the selecting means; designating means, which designate an image to be erased from among the images displayed by the display means; and erasing means, which, of the image designated by the designating means, erase an image displayed in the color selected by the selecting means. By this means, even if two inputted images overlap, by selecting a color for display of each image, it is possible to erase only one of the images. Consequently, the correction operations necessary in the past are no longer necessary, and operability can be greatly improved.

Further, in the foregoing data processing device, the storing means store the images inputted through the input means separately by color selected by the selecting means, and thus storage capacity can be used effectively.

Further, in the foregoing data processing device, the display means display the inputted images in a single color during inputting of the image, and during erasing of the image, display the images in the colors selected by the selecting means. This can prevent confusion during input.

Another structure for the data processing device according to the present invention is made up of receiving means for receiving transmitted images; input means for input of images; storing means for storing the images received through the receiving means and the images inputted through the input means; display means, which display in different colors the received images and the inputted images stored in the storing means; designating means, which designate an image to be erased from among the images displayed by the display means; and erasing means, which erase, of the image designated by the designating means, only an inputted image. By this means, even though the received images and the inputted images are displayed simultaneously, the user can tell at a glance which images were received and which images were inputted, and thus operability is greatly improved.

Further, in the foregoing data processing device, the storing means store the received images and the inputted images in separate storage domains, and thus storage capacity can be used effectively.

Further, in the foregoing data processing device, the display means display the images in a common color during inputting of the image, and during erasing of the images, display the images in different colors. This can prevent confusion during input.

A data processing method according to the present invention is made up of the steps of inputting images; storing the inputted images; selecting a color for each inputted image; displaying the inputted images in the selected colors; designating a displayed image; and erasing, of the designated image, an image displayed in a selected color. With this method, even if inputted images overlap, it is possible to erase only a desired image by selecting the color in which it is displayed. Thus the correction operations necessary in the past are no longer necessary, and operability can be greatly improved.

Another method for the data processing method according to the present invention is made up of the steps of receiving images; inputting images; storing the received images and the inputted images; displaying the stored received images and inputted images; designating an image to be erased from among the displayed images; and erasing, of the designated image, only an inputted image. With this method, even though the received images and the inputted images are displayed simultaneously, the user can tell at a glance which images were received and which images were inputted, and thus operability is greatly improved.

The embodiments and concrete examples of implementation discussed in the foregoing detailed explanation of the present invention serve solely to illustrate the technical contents of the present invention, which should not be narrowly interpreted within the limits of such concrete examples, but rather may be applied in many variations without departing from the spirit of the present invention and the scope of the patent claims set forth below.

What is claimed is:

1. A data processing device comprising:

display means;

input means for input of an image including multiple colors via a single input pointer;

color selecting means for selecting different colors for different portions of the image, wherein said color selecting means selects the different colors via a color selecting area displayed in said display means;

color designating means for designating a color of an image portion to be erased via the color selecting area displayed on said display means;

image erasing means for erasing an image portion displayed in the color designated by said color designating means; and display control means, which cause said display means to display the image inputted through said input means in the color or colors selected by said color selecting means, and which cause said display means to display the image of which a portion has been erased by said erasing means.

2. The data processing device set forth in claim 1, wherein said display control means include:

draw/erase detecting means, which determine whether an image is being inputted through said input means, or whether an image is being erased by said image erasing means;

color selection/designation detecting means, which detect a color selected by said color selecting means and a color designated by said color designating means; and image data preparing means, which, based on results of detecting by said draw/erase detecting means and said color selection/designation detecting means, prepare image data to be provided to said display means.

3. The data processing device set forth in claim 1, wherein said display control means include:

image storing means, which store separately, by color selected by said color selecting means and designated by said color designating means, image portions inputted through said input means and image portions from among which a portion has been erased by said image erasing means.

4. The data processing device set forth in claim 3, wherein said display control means further include:

synthesizing means, which synthesize at least image portions stored in each said image storing means, and produce image data based thereon which is made up of a plurality of colors.

5. The data processing device set forth in claim 1, wherein said display control means include:

color control means, which, during input of an image, cause said display means to display all inputted image portions in a single color, and, during erasing of images, cause said display means to display each inputted image portion in the color selected by said color selecting means.

6. The data processing device set forth in claim 1, wherein:

said display means are a liquid crystal display element.

7. The data processing device set forth in claim 1, wherein:

said input means comprise a touch panel and a pen, and an image is inputted by touching said pen to the surface of said touch panel.

8. The data processing device set forth in claim 7, wherein:

said touch panel is transparent, and is provided so as to cover said display means, and an input position on said touch panel coincides with a display position of said display means.

9. A data processing device comprising;

input means for drawing and erasing of an image including multiple colors using a single pointer;

display means, which display the image drawn through said input means;

mode switching means, which switch between a draw mode, in which input through said input means is drawing of an image, and an erase mode, in which input through said input means is erasing of an image; and color selecting/designating means, which, in draw mode, select a color for an image portion being drawn, and which, in erase mode, designate a color of an image portion to be erased via a color selecting area displayed on said display means.

10. The data processing device set forth in claim 9, further comprising:

receiving means for receiving a transmitted image;

wherein, in draw mode, a color for drawing of an image received through said receiving means and a color for drawing of an image inputted through said input means are set to different colors by said color selecting/ designating means.

11. A data processing device comprising:

display means;

receiving means for receiving a transmitted image;

input means for input of an image;

color designating means, which designate a color of an image portion to be erased;

image erasing means, which erase an image portion displayed in the color designated by said color designating means; and display control means, which cause said display means to display the image received through said receiving means and the image inputted through said input means in different colors, and which cause said display means to display an image of which a portion has been erased by said erasing means.

12. The data processing device set forth in claim 11, wherein said display control means include:

draw/erase detecting means, which determine whether an image is being inputted through said input means, or whether an image is being erased by said image erasing means; and image data preparing means, which, based on results of detecting by said draw/erase detecting means and on output from said receiving means, prepare image data.

13. The data processing device set forth in claim 11, wherein said display control means include:

image storing means, which independently store the image received through said receiving means and the image inputted through said input means.

14. The data processing device set forth in claim 11, wherein said display control means include:

color control means, which, during receiving of an image through said receiving means and during input of an image through said input means, cause said display means to display both images in a common color, and which, during erasing of an image portion, cause said display means to display in different respective colors the image received through said receiving means and the image inputted through said input means.

15. The data processing device set forth in claim 11, wherein:

said display means are a liquid crystal display element.

16. The data processing device set forth in claim 11, wherein:

said input means comprise a touch panel and a pen, and an image is inputted by touching said pen to the surface of said touch panel.

17. The data processing device set forth in claim 16, wherein:

said touch panel is transparent, and is provided so as to cover said display means, and an input position on said touch panel coincides with a display position of said display means.

18. A data processing method comprising:

inputting an image including a plurality of different colors using a single input pointer;

selecting a color for each inputted image portion using a displayed color selecting area on a display;

displaying the inputted image portions in the respective selected colors;

designating a color of an image portion to be deleted via the displayed color selecting area; and erasing an image portion displayed in the designated color.

19. The data processing method set forth in claim 18, wherein:

in said step for displaying the inputted image, all inputted image portions are displayed in a single color.

20. A data processing method comprising the steps of:

receiving a transmitted image;

inputting an image;

displaying the received image and the inputted image in different respective colors;

designating a color of an image portion to be erased; and erasing an image portion displayed in the designated color.

21. The data processing method set forth in claim 20, wherein:

in said step for displaying the received image and the inputted image, the received image and the inputted image are displayed in a common color.

22. The device of claim 1, wherein said image erasing means does not erase any portion of the image that is not of the color selected by said color selecting means.

23. The method of claim 18, where said erasing step further comprises not erasing any portion of the image that is not of the color designated for deletion or erasure.

* * * * *